(12) United States Patent
Kooken et al.

(10) Patent No.: US 6,570,130 B1
(45) Date of Patent: May 27, 2003

(54) DEVICE FOR MONITORING VOLTAGE LEADS AND METHOD OF USING SAME

(75) Inventors: Todd E. Kooken, University Heights, OH (US); Russell K. Myers, Hudson, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 10/054,902

(22) Filed: Jan. 25, 2002

(51) Int. Cl.[7] .............................................. B23K 9/10
(52) U.S. Cl. ............................ 219/130.21; 219/130.01
(58) Field of Search ...................... 219/130.21, 130.01, 219/130.1, 130.31, 130.32, 130.33, 137.05

(56) References Cited

U.S. PATENT DOCUMENTS

| | | | |
|---|---|---|---|
| 5,278,390 A | | 1/1994 | Blankenship |
| 6,066,832 A | * | 5/2000 | Uecker et al. ......... 219/130.31 |
| 6,479,791 B1 | * | 11/2002 | Kowaleski et al. .... 219/130.31 |

* cited by examiner

Primary Examiner—Clifford C. Shaw
(74) Attorney, Agent, or Firm—Fay, Sharpe, Fagan, Minnich & McKee (57) ABSTRACT

A device for terminating operation of the power source of an electric arc welder for passing a current between an electrode and work piece from a first stud connected to the electrode by a first cable and a second stud connected to the work piece by a second cable to perform a welding process. The welder includes an output transformer with a known turns ratio, a primary winding and secondary winding. A first voltage sense lead is connected to the electrode and a second voltage sense lead connected to the work piece. The novel device comprises an executive program to implement a test sequence involving (a) a program routine for comparing a real time theoretical voltage, determined by the pulse waveform at a given time of the waveform, and the voltage at the sense leads at the given time; (b) a program routine to terminate operation of the power source when the theoretical voltage substantially exceeds the sense lead voltage; and, (c) a timing routine to perform the executive program at a set period.

80 Claims, 4 Drawing Sheets

DEVICE FOR MONITORING VOLTAGE LEADS AND METHOD OF USING SAME

This invention relates to the art of electric arc welding and more particularly to a device for monitoring the voltage sense leads of the power source during a welding operation. In addition, the invention involves the novel method of monitoring the continuity of the voltage leads using the unique monitoring device.

BACKGROUND OF INVENTION

In the electric arc welding technology, a power source passes a current between an electrode and a work piece. Often, the electrode is a continuous welding wire drawn from a supply of welding wire, such as a drum or reel, and passed through a contact tip on its way to being melted and deposited onto the work piece. In this type of welding procedure, the power source of the welder includes a first stud connected to the electrode, usually through the contact tip, and a second stud connected to the work piece Connections are by welding cables, which cables may be quite long and include a variety of impedance variables, such as inductive reactance based upon length, position and shape of the cables. When performing a welding process, the power supply receives a current command to create a particular pulse wave between the electrode and work piece. One of the more common power sources is the Power Wave sold by The Lincoln Electric Company of Cleveland, Ohio. Such welder must accurately control the pulse shape or waveform by controlling the voltage to a pulse width modulator operated at a frequency exceeding about 20 kHz. To assure the desired welding operation constituting specific waveforms between the electrode and work piece, the command signal is created based upon a feedback from the actual welding operation. This feedback involves the arc current and/or the arc voltage. Measurement of the arc current for feedback control presents minor distortions, since the current is in a series circuit and is zero when the cables are not connected. However, the arc voltage between the electrode and work piece can not be determined by the voltage between the output studs of the power source. Voltage is affected by not only the impedance of the cables, but also the choke and other impedance creating components in the welding operation. To assure an accurate feedback of arc voltage, it is common practice to use remote voltage sensing leads directed from the controller of the power source to the electrode or contact tip and the work piece. The voltage of these leads determines the command signal to the power source from the controller. Consequently, disastrous results affecting the quality of the weld can occur if the voltage sense leads become disconnected from the welding circuit. Since the voltage command to the power source is determined by the voltage feedback signal, a broken or disconnected sense lead will provide a decreased feedback signal indicating a drop in the arc voltage. Consequently, the voltage command signal to the power source must be increased to compensate for the presumed decrease in arc voltage. This can cause the electrode to melt too rapidly for the advancing wire feed speed so the incoming wire melts into the contact tip. Such event is especially undesirable in automatic or robotics welding. The melt back of the electrode into the contact tip melts the contact tip to produce molten copper that migrates into the weld pool and results in an undesirable metallurgy for the resulting weld. Consequently, it is essential for automatic welding, such as by robot, that the operator be alerted when a voltage sense lead is disconnected or otherwise interrupted. In the past this problem has been addressed by an external device or box that is connected to the studs of the welder and receives remote voltage readings from the leads. If the voltage at the studs is greater than the remote reading plus a normal voltage drop associated with the welding cables, the power source is turned off or the operator is flagged to indicate problems with the welding operation demanding immediate attention. The most common defect is when the voltage lead to the work is broken or disconnected. This external circuitry for verifying the proper status of the voltage sense lead has disadvantages. It requires an additional component or box that is mounted onto the external portion of the power supply and requires skill by the end user for proper installation. It is expensive and time consuming to connect the box to the voltage leads and to the studs. In addition, this component must be monitored which is also expensive. Welder customers do not desire add-on components which therefore drastically reduces the desirability of the prior attempts to determine when the voltage sense leads are not properly connected.

THE INVENTION

The present invention overcomes the disadvantages of the prior art wherein an external box is needed for monitoring the voltage sense leads. In accordance with this invention, a signal representing the voltage which should appear across the leads or at the two power source studs is calculated by knowing the primary voltage, secondary current, turns ratio of output transformer and the duty cycle of the switching network of the power source. After this theoretical voltage is determined for a given time during a specific weld cycle, the synchronized theoretical voltage signal is then compared with the sensed actual voltage at either the studs or the voltage leads for this same given time. Referring specifically to the voltage leads, if one lead becomes disconnected the control circuit will see one-half the actual voltage of the welding operation. If both leads are disconnected, the control circuit will see no voltage. Consequently, by comparing the theoretical calculated voltage with the actual voltage at the voltage sense leads, the proper connection of the sense leads can be monitored on a continuous basis. If the voltage provided by monitoring the voltage sense leads is drastically under the theoretical voltage, the invention terminates operation of the welder. The invention is an executive program that is performed by the digital signal processor in a control board of the type used in most modern welders. The Power Wave welder has such control. The Power Wave is shown in Blankness U.S. Pat. No. 5,278,390, incorporated by reference herein. Thus, by merely calculating the desired theoretical voltage at a given time and reading the voltage at the sense leads at this same time, the program of the present invention sets a status bit in the control program of the welder to terminate operation of the welder immediately. To prevent burn back of the electrode into the contact tip, the total test sequence must be implemented to determined whether the status bit is to terminate operation of the welder within a time less than the time for electrode burn back into the tip. In most welding applications, burn back requires over 50 ms depending upon the type of wire, the wire diameter and the amount of original stick out. Consequently, the algorithm constituting the test sequence is completed within a time substantially less than 50 ms. In practice, this cycle time is less than 5.0 ms. In addition, the invention performs the total program for the test sequence periodically during the welding process to give a real time reading of the voltage at the leads. A total executive program is implemented in a time substantially less than the burn back time and the period of implementing the test sequence is substantially greater than the burn back time. In other words, periodically the test sequence of the present invention is performed. This implementation of the sequence involves a cycle time substantially less than the burn back time. Thus, if there is a problem with the continuity of the sense leads, the welder power source will be terminated prior to the time necessary for electrode burn back. To immediately detect a lead separation the repeat period of the lead sequence is greater than 5 ms, but less than 50 ms.

In practice, there is an exception to the general operation described above. When there is a short circuit operation, there is not enough power available to cause problems with overheating of the electrode. Thus, in accordance with a secondary aspect of the invention, the theoretical voltage on a real time basis is compared to a reference voltage, such as a voltage less than 20 volts, to determine whether the weld cycle is commanding a short circuit. If a short circuit is being required, as determined by the real time theoretical voltage, the test sequence constituting the essence of the present invention is bypassed. This is a short circuit interrupt of the program. When the welding waveform calls for a termination of a short circuit, the theoretical calculated voltage will be drastically increased so the short circuit interrupt of the program forming the present invention will terminate the test sequence of the invention.

In accordance with the invention and to accomplish the procedure set forth above, there is provided a device for interrupting operation of the power source of an electric arc welder of the type passing a current between an electrode and a work piece. The electrode is normally a welding wire passed through a contact tip on its way to the arc between the electrode and work piece. The power source includes a first stud connected to the electrode by a first cable and a second stud connected to the work piece by a second cable to perform a welding process implemented by a command signal to the power source, such as the command signal to a pulse width modulator. The welder of the present invention further has a first voltage sense lead connected to the electrode and a second voltage sense lead connected to the work piece. The primary purpose of the invention is to monitor the continuity of these two leads. They are used to develop the command signal to the power source. If they are not properly connected, the command signal will be distorted. A secondary purpose of the invention is to monitor the output studs of the power source as was done in the prior art. To accomplish the stated primary and secondary objectives, the invention includes an executive program to implement a test sequence that is performed by the digital signal processor of the controller for the welder. This novel inventive sequence involves a program routine performed in the digital signal processor of the welder to create a first signal representing a theoretical voltage value for the computer welding process being performed. This theoretical voltage will change during the welding process according to the desired current shape of the elected welding process. Consequently, the theoretical voltage is for a given time in the waveform of the welding process. For instance, when performing a pulse weld, the theoretical voltage will change during each pulse that is fashioned by the pulse width modulator. Thus, the invention is performed in real time to determine the theoretical voltage at a given instance for use in the test sequence. The invention includes a sense circuit for generating a second signal representing the voltage at the first and second sense leads for the given time. The voltage is digitized and synchronized. In the test sequence, a program routine calculates the real time mathematical relationship of the synchronized first and second signals. Thus, a real time theoretical voltage signal is calculated based upon the portion of a desired wave shape being outputted by the power source. At the same time, the voltage leads are monitored by creating a signal representing the voltage at the leads. These two real time values are compared to the other mathematical relationship, which in practice is a percentage. Then, a threshold circuit is used to set a threshold value of this mathematical relationship so that a decision circuit in the program will create a welder termination fault signal when the mathematical relationship is equal to or less than the threshold value. The test sequence is processed digitally by software commands by the computer of the digital signal processor in the welder. The word "circuit" means a digital series of steps to perform the circuit objective. This test sequence is performed as a software program in the standard digital signal processor available in most modern welders. Especially welders of the type that have a pulse shape generator for controlling the pulse shape of the current through the welding operation. In accordance with an aspect of the invention, the mathematical relationship is a percentage which is approved for operation of the welder if the percentage is greater than 50 or 60%. Should the mathematical relationship be less than 50 or 60%, this is an indication that one of the sense leads is not connected. The invention then proceeds to create the fault signal terminating the operation of the welder.

In accordance with another aspect of the invention, the inventive test sequence is performed periodically during the welding process and has a cycle length of substantially less than the burn back time for the welding operation. This burn back time is normally in the range of at least 50 ms. Thus, the algorithm constituting the test sequence, in accordance with this aspect of the invention, is performed in a cycle length of time less than about 50 ms. In practice, the test sequence is implemented at a period of less than about 50 ms. The cycle length is substantially less than 5 ms and generally in the range of about 1.0–4.0 ms. Preferably, the period is 5.0–20 ms.

The invention can be explained from a different prospective. There is provided a device for controlling the operation of the power source of an electric arc welder for passing a current between an electrode and work piece from a first stud connected to the electrode by a first cable and a second stud connected to the work piece by a second cable. The welder has an output transformer with a known turns ratio, a primary winding and a secondary winding. This welder is provided with a first voltage sense lead connected to the electrode and a second voltage sense lead connected to the work piece. So far this aspect of the invention is consistent with general welding technology. The invention involves the use of an executive program implemented by the digital signal processor of the welder to implement a test sequence with a cycle time of less than 50 ms. This test sequence involves a program routine for comparing a real time theoretical voltage determined by the pulse waveform at a given time and the voltage on the sense leads at the same time. Another routine terminates the operation of the power source when the synchronized theoretical voltage substantially exceeds the sense lead voltage. There is also provided a timer to perform the executive program at a period of less than 50 ms. In accordance with the invention, the theoretical voltage is a calculation as a snapshot at a given time including the input voltage to the primary winding of a transformer, the turns ratio of the transformer and the duty cycle of the power source at that particular instance. The voltage of the leads is also sensed at this time. In accordance with an aspect of the invention, the cycle time of the test sequence is in the general range of 1.0–4.0 ms, while the period is in the range of 5–50 ms. In practice, the range of the period is 5.0–20 ms.

In accordance with a further aspect of the present invention there is provided a method for comparing a calculated snapshot or synchronized theoretical voltage for a portion of a waveform being processed by an electric arc welder and comparing in a digital signal processor the instantaneous or real time theoretical voltage with the sense voltage from the actual voltage on or between the standard voltage sense leads of the welder. The test sequence turns off the welder when the voltage from the sense leads is substantially less than it should be based upon the calculated synchronized theoretical voltage. In this method, the relationship of the instantaneous or real time theoretical voltage to the voltage read from the sense leads is a percentage. If the percentage of the read or monitored voltage is less than a set amount, such as 50–60%, of the intended theoretical voltage, then operation of the welder power source is terminated. In accordance with another aspect of the method, the instantaneous or real time theoretical voltage is compared with the set voltage, such as 18 volts to determine whether a short circuit is being outputted from the power source. If so, then the test sequence is terminated because the theoretical voltage will be quite low and does not require power source interruption and can not properly drive the test sequence.

The primary object of the present invention is the provision of a device for terminating the operation of the power source of an electric arc welder when a sense lead is disconnected. The device is a sequence implemented digitally and compares a theoretically calculated snapshot or synchronized voltage to the read voltage from the voltage leads and/or the studs. The sequence terminates the operation of the welder when the monitored voltages do not reach a certain level of the theoretical real time calculated voltage.

Another object of the present invention is the provision of a device, as defined above, which device is implemented in the digital signal processor of a modern welder. It needs not be in the form of an add-on component or control box external of the welder.

Another object of the present invention is the provision of a method of operating the device, as defined above, which method is easy to implement, consistent in operation and does not require an external component or box on the welder.

Yet another object of the present invention is the provision of a method for monitoring the voltage on voltage sense leads and comparing this voltage to a calculated theoretical voltage at a given time to terminate operation of the welder when the sensed voltage does not reach a pre selected mathematical relationship to the theoretical voltage. The theoretical voltage for a given portion of the waveform involves a calculation using the inputs for a primary voltage to the transformer of the welder, the turns ratio of the transformer and the duty cycle of the power source. In practice, a constant may be used for this calculation to produce a theoretical snapshot voltage. A constant is used to convert the theoretical voltage to the level of a voltage being monitored. This method can also be used for monitoring the voltage on the studs of the power source as a secondary implementation of the invention.

These and other objects and advantages will become apparent from the following description taken together with the accompanying drawings.

PREFERRED EMBODIMENT

Figure 1:
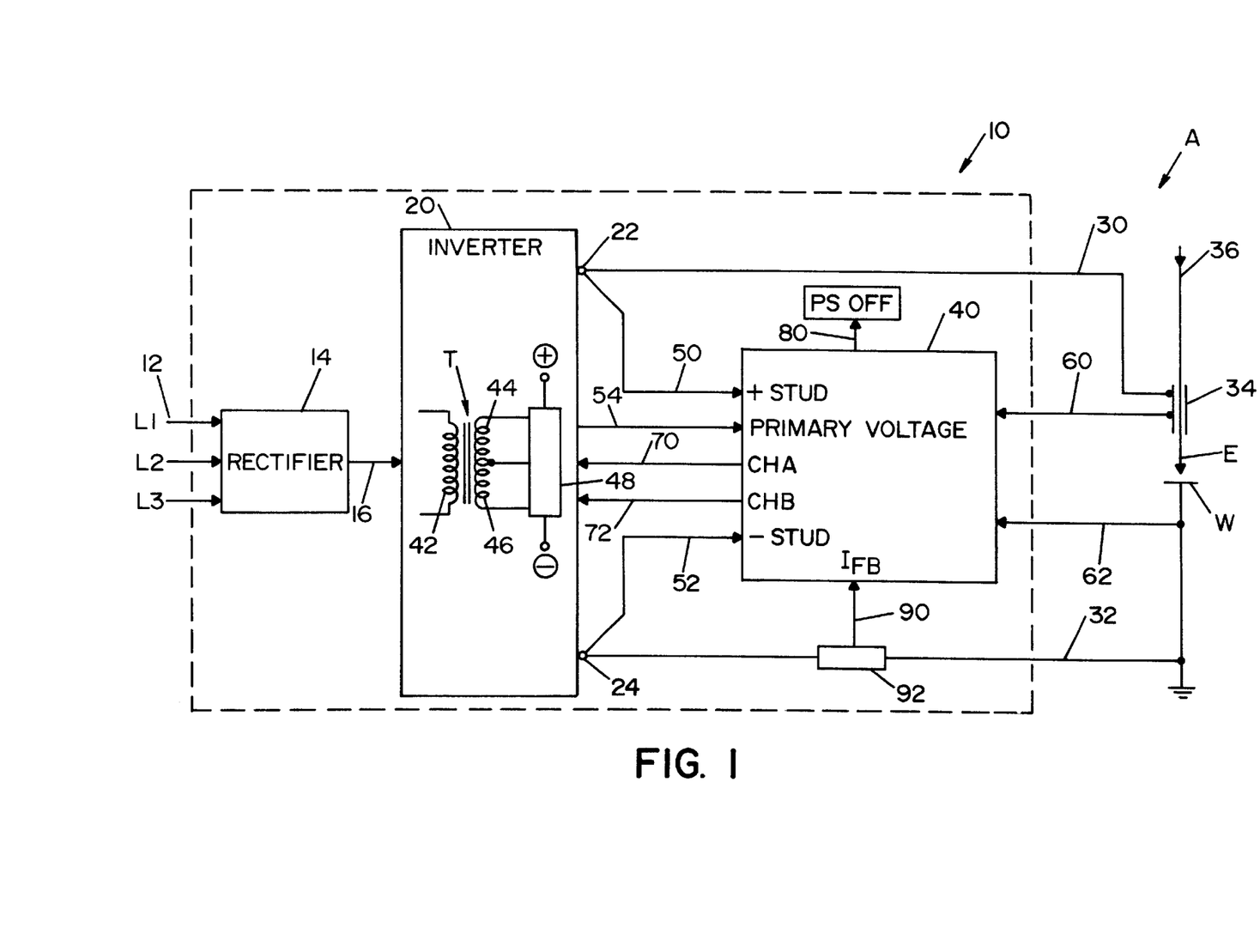
FIG. 1 is a combined block diagram and wiring diagram of a welder utilizing the device and method of the present invention.
Figure 2:
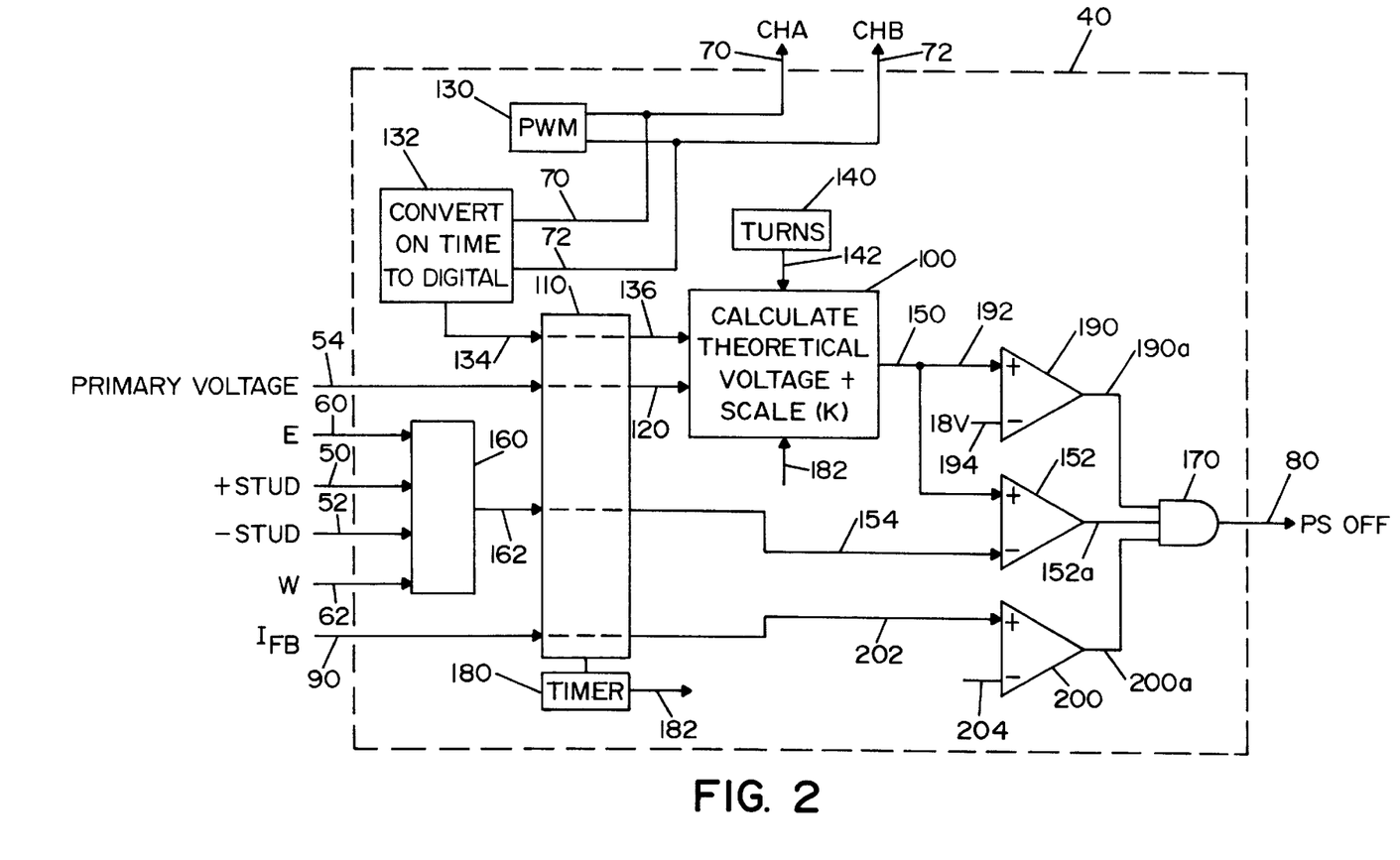
FIG. 2 is a combined block diagram and wiring diagram of the control board used in the preferred embodiment of the present invention.
Figure 6:
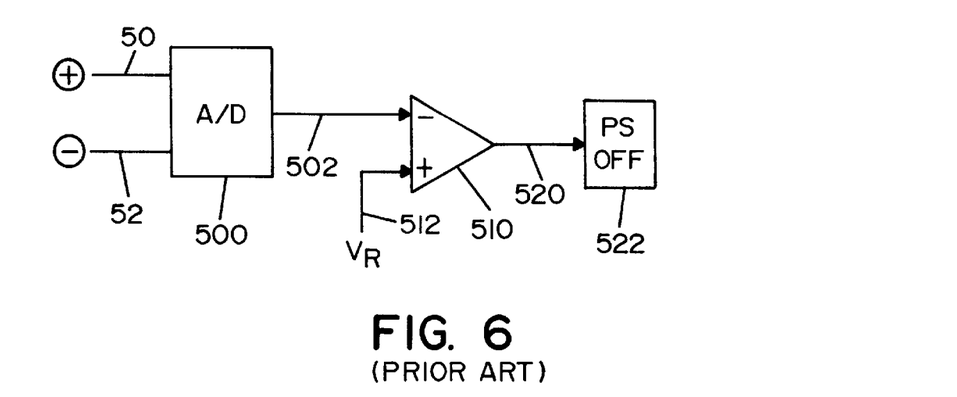

Referring now to the drawings, the showings are for the purpose of illustrating a preferred embodiment of the present invention, except for the prior art shown in FIG. 6. In FIG. 1, welder A includes a standard power source 10 shown in dashed lines. The power source is illustrated as a high switching speed inverter, such as the Power Wave manufactured by The Lincoln Electric Company. In the illustrated power source, a three phase power supply 12 is directed to a rectifier 14 to produce a DC link in line 16, which link is directed to the input of inverter 20 controlled by an internal controller having a digital signal processor to create a series of pulses determined by the duty cycle of a pulse width modulator. The pulse wave modulator controlled by a waveform generator or wave shaper in accordance with standard welding technology. The power source includes output studs 22, 24 connected to long weld cables 30, 32 electrically joining the studs with electrode E and work piece W. In accordance with standard technology, electrode E is a welding wire 36 supplied from a continuous source of welding wire through contact tip 34 to which cable 30 is electrically connected. The output of the inverter is transformer T with primary winding 42, secondary windings 44, 46 and rectifier 48 to give a positive and negative voltage for studs 22, 24, respectively. Board 40, better shown in FIG. 2, is used to control the welding process performed between electrode E and work piece W by controlling the pulse width modulator in accordance with a command signal. Board 40 includes a digital signal processor used in controlling welder A. The digital signal processor is used to perform the test sequence constituting the invention by a dedicated, novel software program loaded into the controller and schematically illustrated in FIG. 3. To implement the test sequence of the present invention, board 40 has input 50 from the positive stud 22 and input 52 from negative stud 24. The voltage of the primary for the output transformer connected to studs 50, 52 is input line 54 whereby board 40 can process a software program reading the primary transformer voltage on line 54. This voltage is determinate of the instantaneous pulse shape being implemented in the welding process. To monitor the operation power source 10, voltage sense leads 60, 62 are connected to the electrode E and work piece W, respectively. As the primary aspect of the invention, these voltage sense leads are monitored by implementation of the novel test sequence at board 40. The voltage sense leads are connected to the board for use as the voltage feedback for the controller oft he welder. Lines 70, 72 output the duty cycle of channel A and channel B used by inverter 20 and created by the waveform generator processed by board 40. The duty cycle is implemented to control the current across electrode E and work piece W at each instance of the welding process for creating a known waveform. The results of using the present invention is that a signal will appear in line 80 when one of the sense leads 60, 62 is disconnected and can not be used for controlling inverter 10. For current control of the inverter, board 40 also has a current feedback input 90 from shunt 92. In operation, board 40 receives voltage signals from sense lines 60, 62 and a current signal from feedback line 90 to control the duty cycle of the pulse width modulator by way of output lines 70,72. This operation of welder A is standard procedure and will successfully control inverter 20 by way of its output transformer T to produce the desired waveform of the welding process performed between electrode E and electrode W. The invention relates to a device and method of detecting when the voltage sense leads 60, 62 are disrupted or not connected. In this situation, a signal appears in line 80 to turn off power source 10 by discontinuing the operation of inverter 20. FIG. 2 provides a general illustration of how the device and method of the present invention is implemented in the welder shown in FIG. 1.

The preferred embodiment of the present invention is disclosed in the diagram of FIG. 2 where software routine 100 calculates a theoretical voltage, which is the snapshot of electrical parameters synchronized by filter 110. The filter converts from analog to digital and samples and holds digital data on the output lines. Digital data on line 120 represents the instantaneous primary voltage on the output transformer of the power source. This voltage from primary winding 42 appears as an analog voltage on line 54. Pulse width modulator 130 in control board 40 controls the duty cycle in channel A and channel B by the logic on lines 70, 72 to give the desired waveform by the duty cycle at each pulse forming a portion of the commanded waveform, as previously described. This duty cycle appearing in the logic on lines 70, 72 is converted into a digital number by the data reading converter 132 having a number output 134. Digital data one line 134 is captured at a given time by a synchronizing filter 110 and applied to the routine 100 by way of output line 136. The digital data as numbers on lines 120, 136 is the instantaneous parameter of power source 10 as commanded by the waveform generator controlling the welding operation. Output transformer T of the power supply has a known number of turns ratio which is recorded in register 140 and outputted as a digital number on line 142. The voltage on primary winding 42 and the duty cycle are variables processed by software routine 100 for a given time in the weld process. The turns ratio represented by the digital number on line 142 is a fixed number. These three parameters in the form of numbers are used to calculate a theoretical voltage level in the form of a number in line 150. In practice, this number is modified by a scale K if desired. Executing routine 100 gives a digital number on line 150, which number is a theoretical voltage level determined by the welding process. This number is the level of the voltage being monitored at a time in the weld operation. The calculated theoretical voltage level number on line 150 in the digital signal processor of board 40 is directed to software comparator 152 having a second input 154 from the synchronizing filter 110. Input 154 is the actual voltage for a given time to be monitored. This actual sensed voltage is captured as a digital number on line 154 by synchronizing filter 110. In accordance with a simplified version of the present invention, the digital number on line 154 would be the voltage between electrode E and work piece W as determined by the voltage on leads 60, 62. However, as a secondary use of the present invention, the voltage between studs 22, 24 as monitored by the analog voltage on lines 50, 52 creates a digital number on line 154. To provide the analog voltage to be monitored, network 160 is used to select the voltage on line 50, the voltage on line 52, or the voltage between lines 60, 62 to name a few possible voltages directed to line 154 through snapshot synchronizing filter 110. This filter captures a voltage at the time used to create a theoretical voltage. The voltage selected by network 160 is converted to a digital number and outputs a number representing the selected voltage on line 162. This analog voltage is synchronized by filter 110 to produce the actual voltage number on line 154. Consequently, the monitored voltage is a number on line 154 and the theoretical calculated voltage based upon the weld process being implemented is a digital number on line 150. These two numbers are compared by a software program shown as comparator 152. If the voltage on line 154 is not close enough to the voltage on line 150, a logic 1 appears in line 152 of the software. However, the voltages bar& close and the voltage on line 154 is not substantially below voltage represented by the number on 150, a logic 0 appears on output 152a. A logic 1 on the output of gate 170 produces a status bit at line 80 turning off the power supply. In the software, there is a timer represented by block 180 to output digital information from filter 110 periodically. This gives a snapshot to synchronize the data prior to implementation of the present invention by software routine 100. The timer starts routine 100 as indicated by a logic change on line 182. This program is implemented within 1.0–4.0 ms after timer 180 captures the data. Thus, if the power supply is turned off, it is turned off within 1,0–4.0 ms of the logic on line 182. This whole process is repeated periodically. In practice, this periodic implementation of the invention occurs about each 5–50 ms. The cycle length is short to prevent burn back of electrode E. The implementation is at a period determined by timer 180. This period is less than burn back time $T_B$. In practice the period is in the range of 5–50 ms. Comparator 152 compares the number on 150 to the number on 154 and produces a logic only when the number on line 154 is substantially less than the number on line 150. In practice, this ratio is 50–60%. Gate 170 is also controlled by the logic from a software comparator 190 having a first input 192 which is the digital number representing the calculated theoretical voltage $V_T$ at any given time. The second input 194 is a number representing the low voltage below 20 volts. In practice, the number on line 194 represents a voltage of 18 volts. If the theoretical voltage at any given time in the welding process is less than the voltage represented by the number on line 194, a logic 0 appears in line 190a to disable the test sequence for checking the lead voltage. A logic 0 on line 190a locks a logic 0 at the output of gates 170. This disables the gate. A logic 1 on line 190a allows the logic on output line 152a to control the logic at the output 80 of gate 170. Thus, when there is a commanded short, the test sequence is disabled for that particular cycle of timer 180. In a like manner, software comparator 200 has an input 202 connected to the filter 110 for digitizing the voltage representing the feedback current. This number is compared with the number on line 204 to produce a logic 1 when there is current flowing. This allows operation of the test sequence only when there is arc current. Thus, when there is current and not a short a logic 1 is on lines 190a and 200a and the logic on line 152a controls the logic on line 82.

Figure 3:
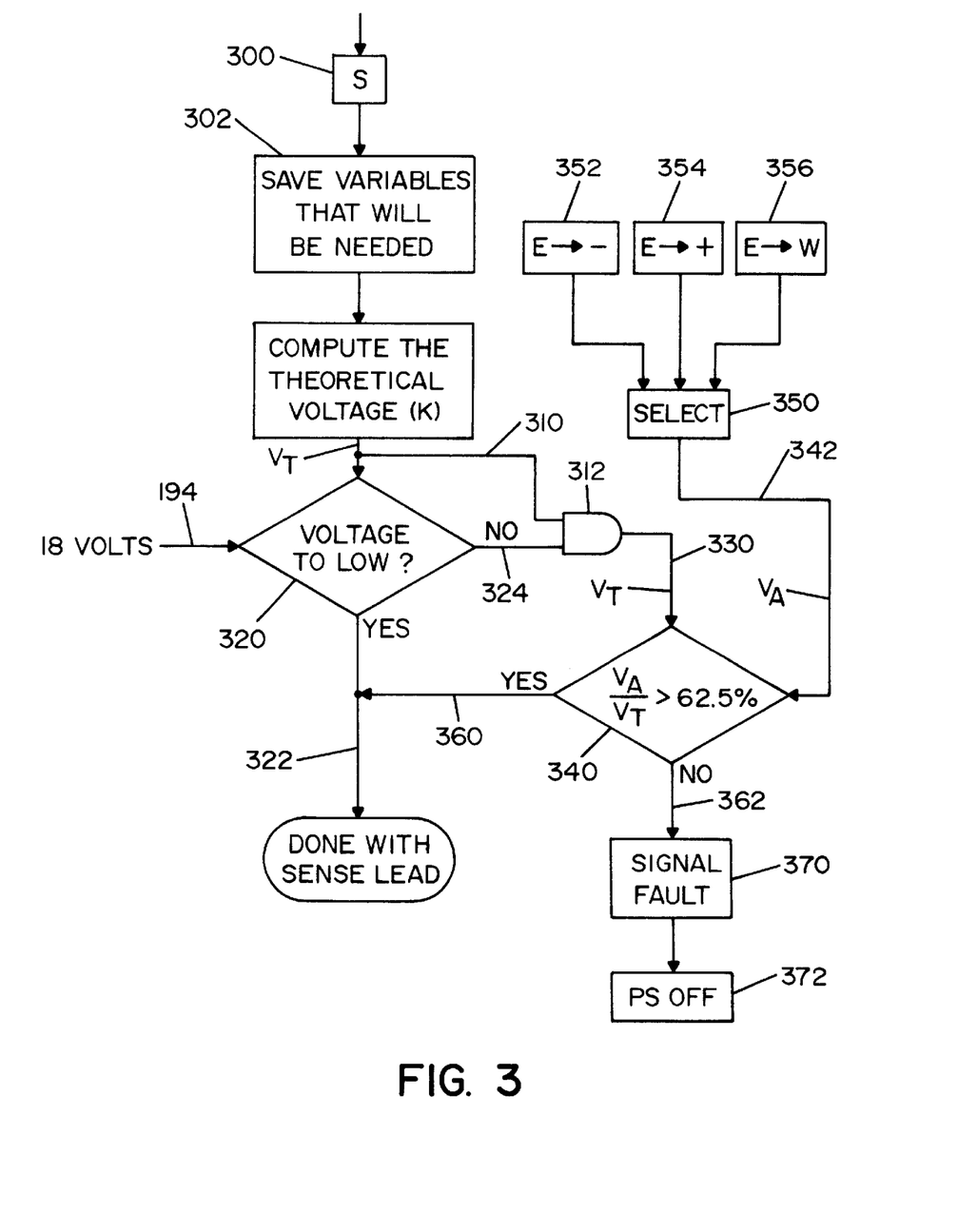
FIG. 3 is a flow chart illustrating the preferred embodiment software program of the present invention.

The software program of the executive program for the novel test sequence is best shown in FIG. 3 which is a block diagram and flow chart of an implementation of the test sequence. Only the control of the logic on line 152a is presented in this software program; however, the software also implements the program described in relationship to the software comparators 190, 200 in FIG. 2. Referring now to FIG. 3, when the algorithm constituting the test sequence of the present invention is to be implemented, the variables, such as primary voltage, duty cycle and transformer turns ratio are converted to digital number and are synchronized as indicated by program block 300. These parameters are saved as a snapshot by filter 110 to be processed as indicated by program block 302. Timer 180 causes computation of the theoretical voltage as indicated by software routine 100 shown in FIG. 2. The output of this calculation is the number $V_T$ on line 310 constituting one input to software gate 312. Line 310 containing the $V_T$ number is also directed to the decision software block 320 having an input number representing 18 volts. This corresponds to the number on line 194 in FIG. 2. If the voltage $V_T$ is too low, there is a command in the waveform for a short circuit. The test sequence is terminated as indicated by line 322 by logic on line 360. If there is no short, gate 312 is enabled by the logic indicated on line 324. This causes the software gate to direct the digital number representing the theoretical voltage to line 330. When there is no short circuit command the number comprising $V_T$ is in line 330. This number is directed to a software program implementing decision block 340 having a second input 342, which is the actual voltage $V_A$ at the synchronized time. This is the particular voltage correlated with the $V_T$ voltage for monitoring by the test sequence set forth in FIG. 3. Select network 350 selects whichever voltage is to be monitored. These voltages are indicated by input blocks 352, 354 and 356. The number on line 342 is compared to the number on line 330 by program decision block 340. This program determines the ratio between the number on line 330 and the number on line 342. If this ratio is greater than a certain threshold number set in the program, the test sequence is terminated as indicated by the logic on line 360. If program block 340 indicates that the number on line 342 is not at least the set threshold number, a logic appears in line 362 to provide a fault signal as indicated by block 370 to turn off power supply 10 as indicated by block 372. The test sequence can include the logic or logics from comparators 190, 200.

The program routine of block 100 uses a snapshot captured set of variables indicative of the instantaneous or real time commanded voltage for the particular voltage selected by network 350. The selected voltage is communicated to block 110 and also block 302 so $V_T$ will be correlated to the selected $V_A$. The decision circuit or block 340 contains a set threshold number, which in practice is 62.5%. Although the percentage can be greater than 50% or greater than 60%. Preferably, it is greater than 60%, as indicated in the flow chart of FIG. 3. The minimum voltage on line 194 can be adjusted. In practice, it is 18 volts. The program shown in FIG. 3 is implemented digitally; however, analog components could be employed in practicing the invention if desired.

Figure 4:
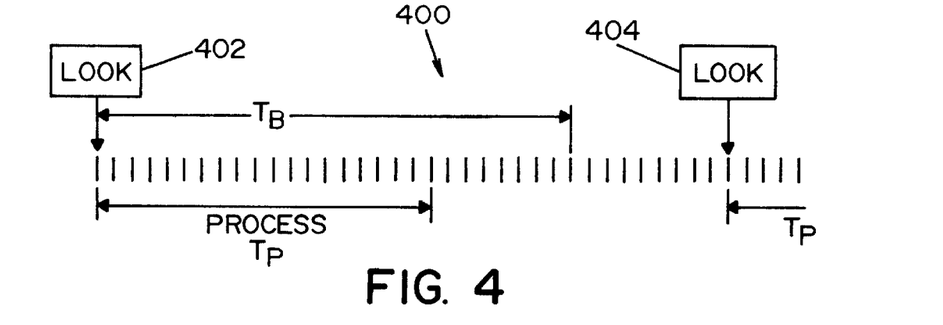
FIG. 4 is a pulse diagram showing the timing aspects used in the device and method of the present invention.
Figure 5:
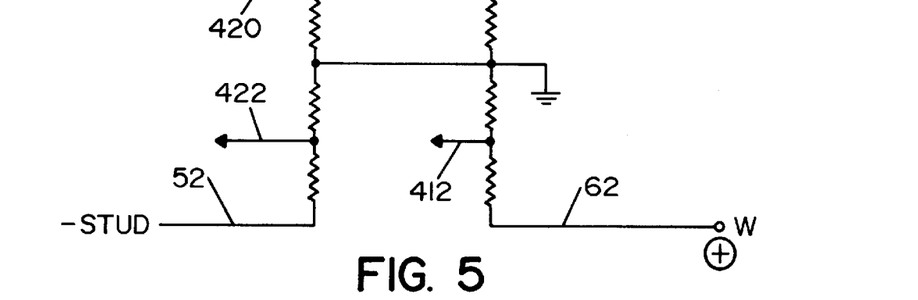
FIG. 5 is a wiring diagram illustrating the preferred embodiment for introducing voltages being monitored during use of the test sequence constituting the present invention; and, FIG. 6 is a schematic diagram illustrating the prior art to which the present invention is directed.

The test sequence performed by the executive program of FIG. 3 is implemented periodically during the welding process at a fairly rapid rate so that any break in leads 60, 62 will be detected. A timing diagram 400 representing the concept of a timing aspect of the invention is illustrated in FIG. 4. Diagram 400 shows a test sequence implemented periodically between the "look" blocks 402, 404. In practice, these looks are greater than 5 ms and in the general range of 5–50 ms. Since they relate to welding cycles to detect breaking of the leads, they need not be repeated rapidly. If performed just during each cycle or every other cycle, the invention could be implemented. In practice however they are performed at a period of less than 50 ms. The more critical aspect of the invention is the relationship of the cycle time $T_P$ for implementing the total test procedure or sequence shown in FIG. 3. Time $T_P$ is generally less than 5 ms and preferably in the range of 1.0–4.0 ms. In that manner, the test cycle is implemented before the electrode can burn back into the contact tip. The burn back time $T_B$ is shown in diagram 400 and is at least about 50 ms. Although the test sequence can be done at various frequencies, to assure that there is no burn back during the welding operation, looks 402, 404 should be rapidly performed, i.e. At a period of less than 50 ms. Look 404 will be before time $T_B$ from look 402 even though this is not shown in FIG. 4. FIG. 5 shows the internal wiring of selector network 160 wherein the analog voltage on line 410 and line 412 senses the voltage relating to voltage sense lines 60, 62. In a like manner, the analog voltage on lines 420, 422 are the analog values when monitoring the studs. Selector network 160 reads the analog voltages on one of the lines 410, 412, 420 and 422 to input analog voltage on line 162. A digital representation of the analog voltage is provided on line 154 by synchronizing filter 110 to perform the test sequence. The present invention replaces an external component, as shown in FIG. 6, wherein the analog voltages on lines 50, 52 are converted by analog to digital converter 500 to produce a number on line 502. Software comparator 510 compares the number on line 502 with the remote voltage number on line 512 from the sense leads of the welding operation. This comparison turns off the power supply when the relationship between the studs and the voltage on the sense lines is not the same. This operation produces a logic on line 520 to turn off power source as indicated by block 522. The relationship between the prior art and the present invention is a comparison between the prior art shown in FIG. 6 and the preferred embodiment of the present invention as described.

The rate, or period, that data is sampled and checked should be faster than burn back $T_B$. The actual time for implementing the algorithm $T_P$ is less than 5.0 ms. The algorithm is physically located in a section for the code that runs in the background of the program controlling welder A. In practice, the digital signal processor progresses through a control loop every 25 microseconds to control the inverter. With whatever time is left, a background task runs. The time of 5.0 ms for the cycle time is 200 switching cycles of the inverter. Normally the test routine runs every 10 ms; but, the constraint is less than 50ms. This is a practical limit and is not a limitation of the broad aspect of the invention.

The present invention is implemented in software by the digital signal processor in the controller of a normal welder of the type having a pulse width modulator for controlling the shape of the pulses being used in a particular weld process. A combination of analog and software digital processing can be used in practicing the present invention. The particular sequence and software components is not intended to be limiting to the present invention.

Having thus defined the invention, the following is claimed:

1. A device for terminating operation of the power source of an electric arc welder for passing a current between an electrode and work piece from a first stud connected to said electrode by a first cable and a second stud connected to said work piece by a second cable to perform a welding process, said welder further having a first voltage sense lead connected to said electrode and a second voltage sense lead connected to said work piece, said device comprising: an executive program to implement a test sequence, said sequence involving program routine to create a first signal representing a theoretical voltage value for a given time in said welding process, a sense circuit for generating a second signal representing the voltage at said first and second sense leads at said given time, a calculation program routine to calculate a real time mathematical relationship of said first and second signals, a threshold circuit to set a threshold value of said mathematical relationship, and a decision circuit for creating a welder terminating fault signal when said mathematical relationship is equal to or less than said threshold value.

2. A device as defined in claim 1 wherein said mathematical relationship is a percentage of that said voltage across said first and second sense leads is of said theoretical voltage.

3. A device as defined in claim 2 wherein said percentage is greater than 50%.

4. A device as defined in claim 3 wherein said percentage is greater than 60%.

5. A device as defined in claim 3 including a circuit for comparing said theoretical voltage with a set minimum voltage level and a circuit to terminate said test sequence when said theoretical voltage value is less than said set minimum voltage level.

6. A device as defined in claim 5 wherein said minimum voltage level is less than 20 volts.

7. A device as defined in claim 2 wherein said percentage is greater than 60%.

8. A device as defined in claim 7 including a circuit for comparing said theoretical voltage with a set minimum voltage level and a circuit to terminate said test sequence when said theoretical voltage value is less than said set minimum voltage level.

9. A device as defined in claim 8 wherein said minimum voltage level is less than 20 volts.

10. A device as defined in claim 2 including a circuit for comparing said theoretical voltage with a set minimum voltage level and a circuit to terminate said test sequence when said theoretical voltage value is less than said set minimum voltage level.

11. A device as defined in claim 10 wherein said minimum voltage level is less than 20 volts.

12. A device as defined in claim 10 wherein said weld process involves passing said electrode through a contact tip to create a stick out and having a burn back time $T_{B-}$ when the arc current will melt said electrode to eliminate said stick out and a program timer to perform said test sequence periodically at a period less than said burn back time and for a cycle time $T_P$ substantially less than said burn back time.

13. A device as defined in claim 12 wherein said sense circuit further includes a sense circuit to sense the voltage at one of said studs and select network to replace said voltage at said sense leads with said voltage at one or both of said studs.

14. A device as defined in claim 10 wherein test sequence is repeated at a period less than 50 ms and has a cycle time $T_P$ of less than 5 ms.

15. A device as defined in claim 14 wherein said sense circuit further includes a sense circuit to sense the voltage at one of said studs and select network to replace said voltage at said sense leads with said voltage at one or both of said studs.

16. A device as defined in claim 2 wherein said weld process involves passing said electrode through a contact tip to create a stick out and having a burn back time $T_{B-}$ when the arc current will melt said electrode to eliminate said stick out and a program timer to perform said test sequence periodically at a period less than said burn back time and for a cycle time $T_P$ substantially less than said burn back time.

17. A device as defined in claim 16 wherein said sense circuit further includes a sense circuit to sense the voltage at one of said studs and select network to replace said voltage at said sense leads with said voltage at one or both of said studs.

18. A device as defined in claim 2 wherein test sequence is repeated at a period less than 50 ms and has a cycle time $T_P$ of less than 5 ms.

19. A device as defined in claim 18 wherein said sense circuit further includes a sense circuit to sense the voltage at one of said studs and select network to replace said voltage at said sense leads with said voltage at one or both of said studs.

20. A device as defined in claim 2 wherein said sense circuit further includes a sense circuit to sense the voltage at one of said studs and select network to replace said voltage at said sense leads with said voltage at one or both of said studs.

21. A device as defined in claim 1 including a circuit for comparing said theoretical voltage with a set minimum voltage level and a circuit to terminate said test sequence when said theoretical voltage value is less than said set minimum voltage level.

22. A device as defined in claim 21 wherein said minimum voltage level is less than 20 volts.

23. A device as defined in claim 21 wherein said weld process involves passing said electrode through a contact tip to create a stick out and having a burn back time $T_{B-}$ when the arc current will melt said electrode to eliminate said stick out and a program timer to perform said test sequence periodically at a period less than said burn back time and for a cycle time $T_P$ substantially less than said burn back time.

24. A device as defined in claim 21 wherein test sequence is repeated at a period less than 50 ms and has a cycle time $T_P$ of less than 5 ms.

25. A device as defined in claim 1 wherein said weld process involves passing said electrode through a contact tip to create a stick out and having a burn back time $T_{B-}$ when the arc current will melt said electrode to eliminate said stick out and a program timer to perform said test sequence periodically at a period less than said burn back time and for a cycle time $T_P$ substantially less than said burn back time.

26. A device as defined in claim 25 wherein said sense circuit further includes a sense circuit to sense the voltage at one of said studs and select network to replace said voltage at said sense leads with said voltage at one or both of said studs.

27. A device as defined in claim 1 wherein test sequence is repeated at a period less than 50 ms and has a cycle time $T_P$ of less than 5 ms.

28. A device as defined in claim 27 wherein said sense circuit further includes a sense circuit to sense the voltage at one of said studs and select network to replace said voltage at said sense leads with said voltage at one or both of said studs.

29. A device as defined in claim 1 wherein said sense circuit further includes a sense circuit to sense the voltage at one of said studs and select network to replace said voltage at said sense leads with said voltage at one or both of said studs.

30. A device for terminating operation of the power source of an electric arc welder for passing a current between an electrode and work piece from a first stud connected to said electrode by a first cable and a second stud connected to said work piece by a second cable to perform a welding process, said welder further having a first voltage sense lead connected to said electrode and a second voltage sense lead connected to said work piece, said device comprising: an executive program to implement a test sequence, said sequence involving program routine to create a first signal representing a theoretical voltage value for a given time in said welding process, a network for selecting a second signal representing the voltage at or between, said first stud, said second stud, said first or second sense leads at said given time, a calculation program routine to calculate a real time mathematical relationship of said first and second signals, a threshold circuit to set a threshold value of said mathematical relationship, and a decision circuit for creating a welder terminating fault signal when said mathematical relationship is equal to or less than said threshold value.

31. A device as defined in claim 30 wherein said mathematical relationship is a percentage oft hat said voltage across said first and second sense leads is of said theoretical voltage.

32. A device as defined in claim 31 wherein said percentage is greater than 50%.

33. A device as defined in claim 32 wherein said percentage is greater than 60%.

34. A device as defined in claim 31 wherein said percentage is greater than 60%.

35. A device as defined in claim 30 including a circuit for comparing said theoretical voltage with a set minimum voltage level and a circuit to terminate said test sequence when said theoretical voltage value is less than said set minimum voltage level.

36. A device as defined in claim 35 wherein said minimum voltage level is less than 20 volts.

37. A device as defined in claim 30 wherein said weld process involves passing said electrode through a contact tip to create a stick out and having a burn back time $T_{B_-}$ when the arc current will melt said electrode to eliminate said stick out and a program timer to perform said test sequence periodically at a period less than said bum back time and for a cycle time $T_P$ substantially less than said burn back time.

38. A device as defined in claim 30 wherein test sequence is repeated at a period less than 50 ms and has a cycle time $T_P$ of less than 5 ms.

39. A method for terminating operation of the power source of an electric arc welder for passing a current between an electrode and work piece from a first stud connected to said electrode by a first cable and a second stud connected to said work piece by a second cable to perform a welding process, said welder further having a first voltage sense lead connected to said electrode and a second voltage sense lead connected to said work piece, said method comprising:

(a) creating a first signal representing a theoretical voltage value for a given time in said welding process;

(b) generating a second signal representing the voltage at said first and second sense leads at said given time;

(c) calculating a real time mathematical relationship of said first and second signals;

(d) setting a threshold value of said mathematical relationship, and, (e) creating a welder terminating fault signal when said mathematical relationship is equal to or less than said threshold value.

40. A method as defined in claim 39 wherein said mathematical relationship is a percentage of that said voltage across said first and second sense leads is of said theoretical voltage.

41. A method as defined in claim 40 wherein said percentage is greater than 50%.

42. A method as defined in claim 41 wherein said percentage is greater than 60%.

43. A method as defined in claim 41 including:

(f) comparing said theoretical voltage with a set minimum voltage level; and, (g) terminating said test sequence when said theoretical voltage value is less than said set minimum voltage level.

44. A method as defined in claim 43 wherein said minimum voltage level is less than 20 volts.

45. A method defined in claim 40 wherein said percentage is greater than 60%.

46. A method as defined in claim 40 including:

(f) comparing said theoretical voltage with a set minimum voltage level; and, (g) terminating said test sequence when said theoretical voltage value is less than said set minimum voltage level.

47. A method as defined in claim 46 wherein said minimum voltage level is less than 20 volts.

48. A method as defined in claim 39 including:

(f) comparing said theoretical voltage with a set minimum voltage level; and, (g) terminating said test sequence when said theoretical voltage value is less than said set minimum voltage level.

49. A method as defined in claim 48 wherein said minimum voltage level is less than 20 volts.

50. A method as defined in claim 39 wherein said weld process involves passing said electrode through a contact tip to create a stick out and having a burn back time $T_{B_-}$ when the arc current will melt said electrode to eliminate said stick out and further including:

(f) performing said test sequence periodically at a period less than said burn back time and for a cycle time $T_P$ substantially less than said burn back time.

51. A method as defined in claim 50 wherein said cycle time is in the range of 20–40 ms.

52. A method as defined in claim 39 further comprising:

(f) repeating said test sequence at a period of over 100 ms and with a cycle time $T_P$ of less than 50 ms.

53. A method as defined in claim 39 further including:

(f) sensing the voltage at one of said studs; and, (g) replacing said voltage at said sense leads with said voltage at one or both of said studs.

54. A device for terminating operation of the power source of an electric arc welder for passing a current between an electrode and work piece from a first stud connected to said electrode by a first cable and a second stud connected to said work piece by a second cable to perform a welding process, said welder further having an output transformer with a known turns ratio, a primary winding and secondary winding, a first voltage sense lead connected to said electrode and a second voltage sense lead connected to said work piece, said device comprising: an executive program to implement a test sequence with a cycle time of less than 5.0 ms, said test sequence involving a program routine for comparing a real time theoretical voltage determined by the pulse waveform at a given time of said waveform and the voltage on said sense leads at said given time; a program routine to terminate operation of said power source when said theoretical voltage substantially exceeds said sense lead voltage; and, a timing routine to perform said executive program at a set period.

55. A device as defined in claim 54 wherein said theoretical voltage is a calculation including the input voltage to said primary winding of said transformer, the turns ratio of said transformer and the duty cycle of said power source.

56. A device as defined in claim 55 including a circuit for comparing said theoretical voltage with a set minimum voltage level and a circuit to terminate said test sequence when said theoretical voltage value is less than said set minimum voltage level.

57. A device as defined in claim 56 wherein said minimum voltage level is less than 20 volts.

58. A device as defined in claim 57 wherein said cycle time is in the general range of 1.0–4.0 ms.

59. A device as defined in claim 57 wherein said set period is less than 50 ms.

60. A device as defined in claim 57 wherein said set period is greater than 5 ms.

61. A device as defined in claim 57 wherein said set period is in the range of 5.0–20 ms.

62. A device as defined in claim 56 wherein said cycle time is in the general range of 1.0–4.0 ms.

63. A device as defined in claim 57 wherein said set period is less than 50 ms.

64. A device as defined in claim 56 wherein said set period is greater than 5 ms.

65. A device as defined in claim 56 wherein said set period is in the range of 5.0–20 ms.

66. A device as defined in claim 55 wherein said cycle time is in the general range of 1.0–4.0 ms.

67. A device as defined in claim 56 wherein said set period is less than 50 ms.

68. A device as defined in claim 55 wherein said set period is greater than 5 ms.

69. A device as defined in claim 55 wherein said set period is in the range of 5.0–20 ms.

70. A device as defined in claim 54 including a circuit for comparing said theoretical voltage with a set minimum voltage level and a circuit to terminate said test sequence when said theoretical voltage value is less than said set minimum voltage level.

71. A device as defined in claim 70 wherein said minimum voltage level is less than 20 volts.

72. A device as defined in claim 71 wherein said cycle time is in the general range of 1.0–4.0 ms.

73. A device as defined in claim 72 wherein said set period is less than 50 ms.

74. A device as defined in claim 60 wherein said set period is greater than 5 ms.

75. A device as defined in claim 72 wherein said set period is in the range of 5.0–20 ms.

76. A device as defined in claim 70 wherein said cycle time is in the general range of 1.0–4.0 ms.

77. A device as defined in claim 54 wherein said cycle time is in the general range of 1.0–4.0 ms.

78. A device as defined in claim 54 wherein said set period is less than 50 ms.

79. A device as defined in claim 54 wherein said set period is greater than 5 ms.

80. A device as defined in claim 54 wherein said set period is in the range of 5.0–20 ms.

* * * * *